United States Patent
Anupindi et al.

(10) Patent No.: US 7,843,170 B2
(45) Date of Patent: Nov. 30, 2010

(54) BATTERY BACKUP UNIT (BBU) ASSEMBLY

(75) Inventors: Lakshmana Anupindi, Suwanee, GA (US); Brian Skinner, Gainesville, GA (US)

(73) Assignee: LSI Corporation, Milpitas, CA (US)

( * ) Notice: Subject to any disclaimer, the term of this patent is extended or adjusted under 35 U.S.C. 154(b) by 250 days.

(21) Appl. No.: 12/150,399

(22) Filed: Apr. 28, 2008

(65) Prior Publication Data

US 2009/0268415 A1    Oct. 29, 2009

(51) Int. Cl.
*H02J 7/00* (2006.01)
(52) U.S. Cl. ........................ 320/134; 361/748
(58) Field of Classification Search .............. 320/134
See application file for complete search history.

(56) References Cited

U.S. PATENT DOCUMENTS

| | | | |
|---|---|---|---|
| 6,690,559 B2 * | 2/2004 | Yoshida | 361/100 |
| 6,992,463 B2 * | 1/2006 | Yoshio | 320/134 |
| 7,378,819 B2 * | 5/2008 | Wang et al. | 320/121 |
| 7,595,610 B2 * | 9/2009 | Poff | 320/134 |
| 7,656,125 B2 * | 2/2010 | Lampe-Onnerud et al. | 320/134 |
| 2006/0152194 A1 * | 7/2006 | Wang et al. | 320/121 |
| 2007/0029972 A1 * | 2/2007 | Lampe-Onnerud et al. | 320/132 |
| 2007/0145944 A1 * | 6/2007 | Poff | 320/112 |

* cited by examiner

*Primary Examiner*—Edward Tso
*Assistant Examiner*—Ramy Ramadan
(74) *Attorney, Agent, or Firm*—Suiter Swantz pc llo

(57) ABSTRACT

The present invention is a Battery Backup Unit (BBU) Assembly. The BBU Assembly may include a Printed Circuit Board (PCB). The BBU Assembly may further include a protection circuit connected to the PCB. The BBU Assembly may further include a battery pack connected to the PCB. The battery pack may include a plurality of Lithium-ion (Li-ion) cells. The battery pack may be configured as a 2-cell series stack, a 3-cell series stack, or a 4-cell series stack. The BBU Assembly is configured for electrically connecting the battery pack to the protection circuit.

12 Claims, 6 Drawing Sheets

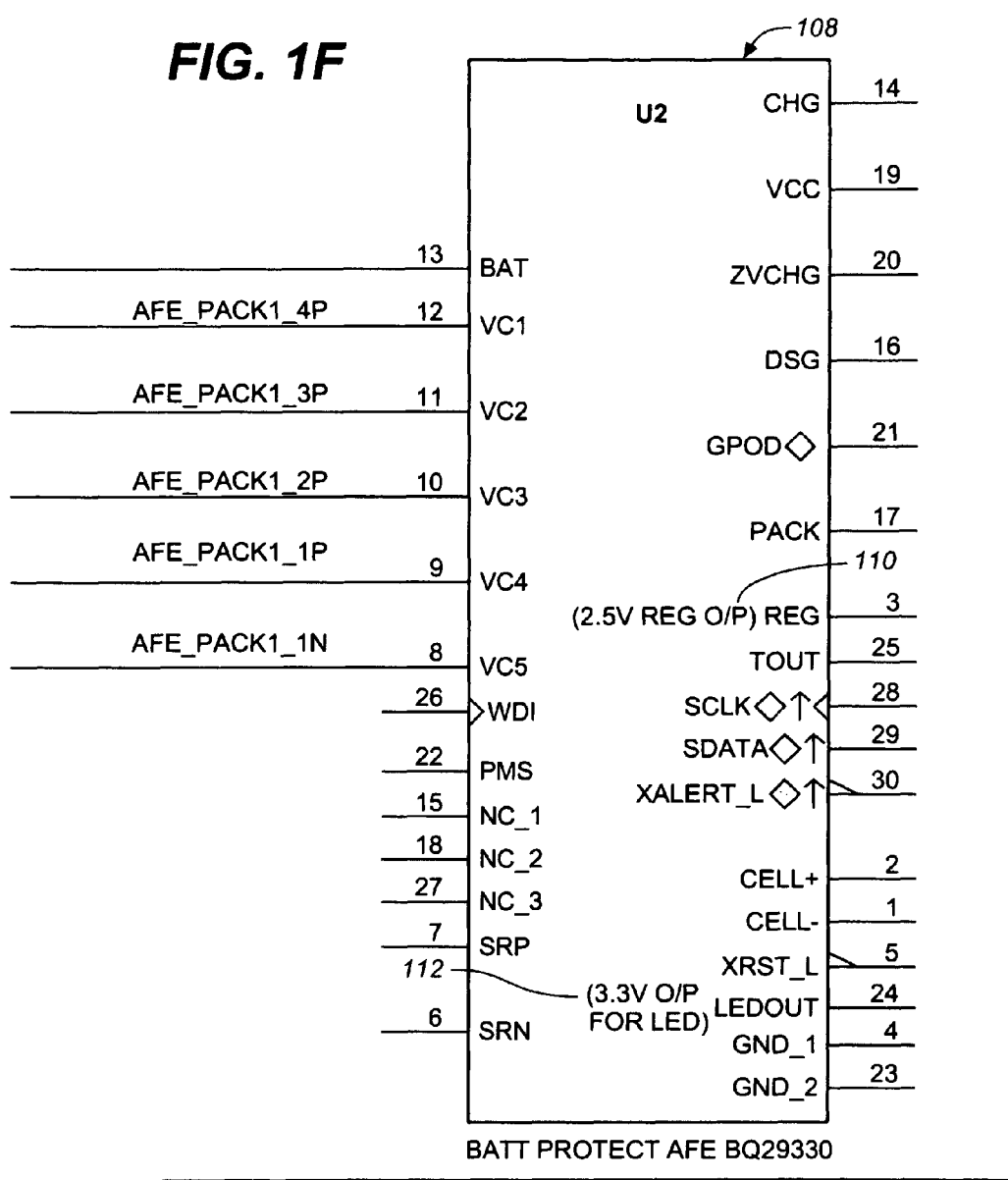

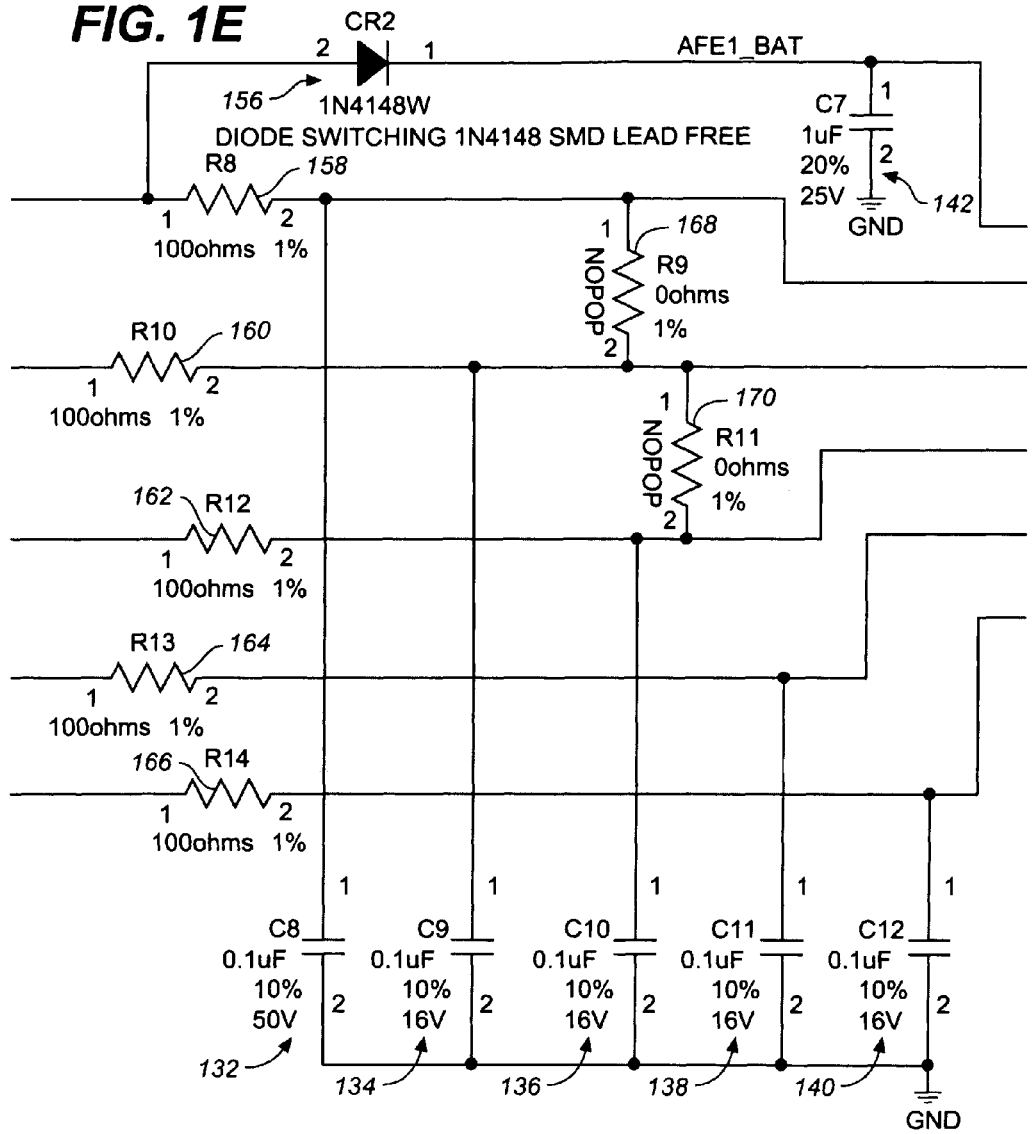

BATTERY BACKUP UNIT (BBU) ASSEMBLY

FIELD OF THE INVENTION

The present invention relates to the field of Battery Backup Unit (BBU) Assemblies and particularly to a BBU Assembly (which includes a Printed Circuit Board (PCB)) that is configured for accepting 2, 3, or 4 series stacks of Lithium-ion (Li-ion) cells and which electrically connects the battery pack with one or more protection circuits.

BACKGROUND OF THE INVENTION

Currently existing Li-ion battery pack designs require safety circuits for Underwriters' Laboratories (UL) and United Nations-Department of Transportation (UN-DOT) certification. Space constraints mandated by currently existing chassis require that a PCB layout/PCB design of a BBU Assembly for supporting said battery pack designs be creative for meeting said constraints and keeping said layout/design compatible with the volume of the BBU Customer Replaceable Unit (CRU).

Therefore, it may be desirable to provide a solution which addresses the above-referenced problems associated with existing BBU assemblies.

SUMMARY OF THE INVENTION

Accordingly, an embodiment of the present invention is directed to a Battery Backup Unit (BBU) Assembly, including: a Printed Circuit Board (PCB); a protection circuit connected to the PCB; and a battery pack connected to the PCB, the battery pack including a plurality of Lithium-ion (Li-ion) cells, the BBU Assembly being configured for electrically connecting the battery pack to the protection circuit, wherein the battery pack is configured as one of a 2-cell series stack, a 3-cell series stack, and a 4-cell series stack.

A further embodiment of the present invention is directed to a Battery Backup Unit (BBU) Assembly, including: a Printed Circuit Board (PCB); a Lithium-ion battery pack full protection Analog Front End (AFE) Integrated Circuit (IC) connected to the PCB; a secondary overvoltage protection Integrated Circuit (IC) connected to the PCB; a battery pack connected to the PCB, the battery pack being configured for being electrically connectable to the Lithium-ion battery pack full protection AFE IC and the secondary overvoltage protection IC, the battery pack including a plurality of Lithium-ion (Li-ion) cells; and a blow fuse connected to the PCB, the blow fuse being electrically connected to an output of the secondary overvoltage protection IC, wherein the battery pack is configured as one of a 2-cell series stack, a 3-cell series stack, and a 4-cell series stack.

An additional embodiment of the present invention is directed to a Printed Circuit Board, including: a first section configured for connecting to a Lithium-ion battery pack, the Lithium-ion battery pack being configured as one of a 2-cell series stack, a 3-cell series stack, and a 4-cell series stack; and a second section configured for connecting to a Lithium-ion battery pack full protection Analog Front End (AFE) Integrated Circuit (IC), wherein the PCB is configured for connecting with the Lithium-ion battery pack full protection Analog Front End (AFE) Integrated Circuit (IC) such that the AFE IC is electrically connectable to the battery pack.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIGS. 1A-1F, which collectively represent FIG. 1 are an illustration of a Battery Backup Unit (BBU) Assembly in accordance with an exemplary embodiment of the present invention.

DETAILED DESCRIPTION OF THE INVENTION

Li-ion battery pack designs generally require safety circuits for Underwriters' Laboratories (UL) and United Nations-Department of Transportation (UN-DOT) certification. Space constraints mandated by currently existing chassis require that a PCB layout/PCB design of a BBU Assembly for supporting said battery pack designs be creative for meeting said constraints and keeping said layout/design compatible with the volume of the BBU Customer Replaceable Unit (CRU). One existing solution has involved the implementation of multiple PCBs/multiple PCB cards. However, implementing multiple PCBs presents a number of disadvantages. For example, implementation of multiple PCBs may increase the cost of the design beyond a desired level. Further, implementation of multiple PCBs may be labor-intensive to implement in that it may require testing/verification to be performed for each PCB. Still further, implementation of multiple PCBs may require maintenance of multiple Stockkeeping units (SKUs). Another existing solution has involved increasing the size of the PCB(s) which is/are implemented. However, increasing the size of the implemented PCB(s) may be disadvantageous in that it may require that corresponding modifications be made to the chassis to adapt the chassis to the larger PCB(s).

A further existing solution for meeting certain BBU assembly design needs has been to increase the number of Lithium-ion (Li-ion) cells which are implemented. However, implementation of more cells has the drawbacks of increasing cost, requiring more space, and presenting more issues/obstacles regarding UL/UN-DOT certification. A still further solution has involved implementation of Li-ion cells having better/different Li-ion chemistries. However, the accompanying Original Equipment Manufacturer (OEM) buy-off which may be involved when implementing cells with different/better Li-ion chemistries may prove to be expensive.

Reference will now be made in detail to the presently preferred embodiments of the invention, examples of which are illustrated in the accompanying drawings.

Figure 1A:
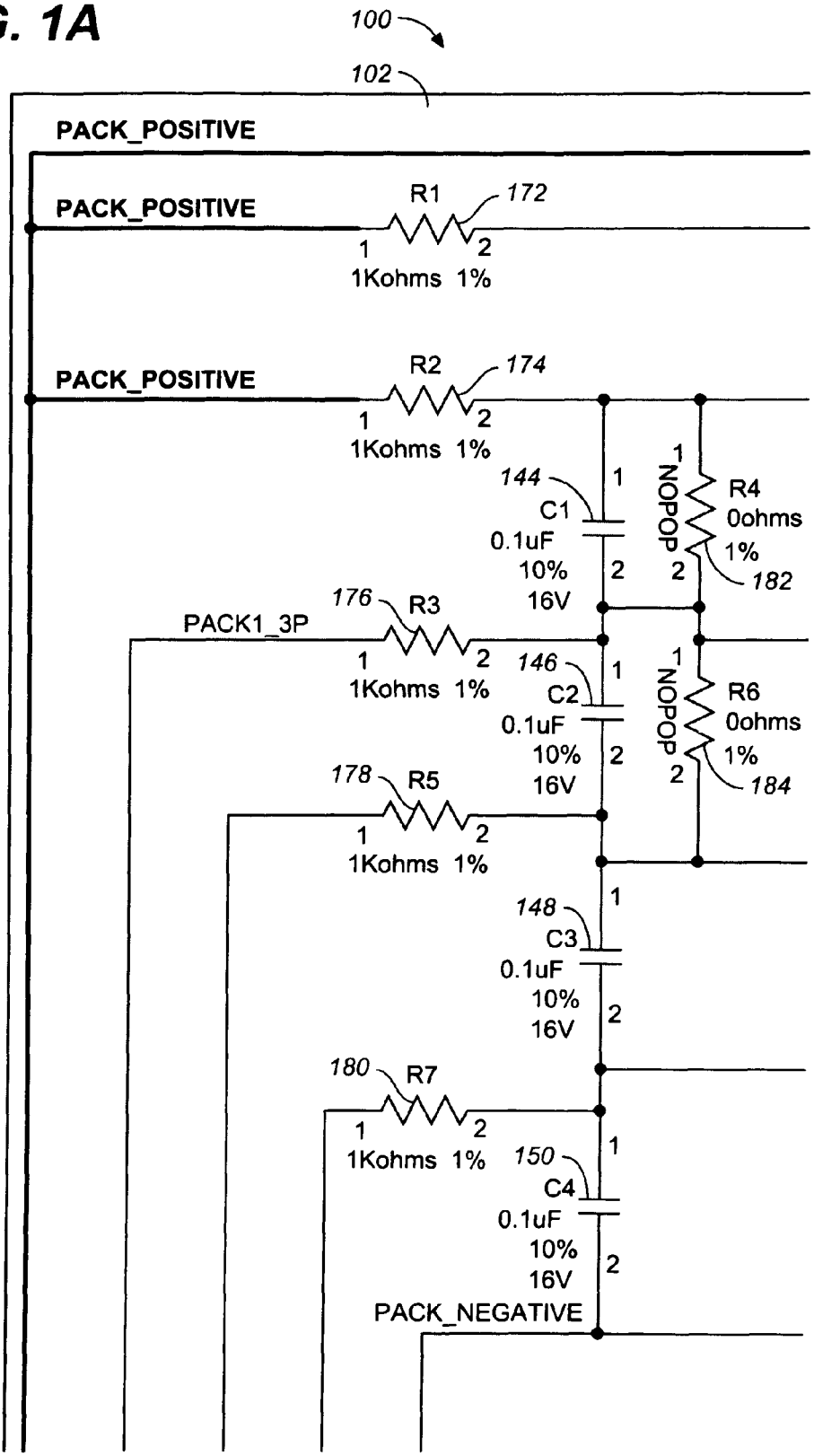
Figure 1B:
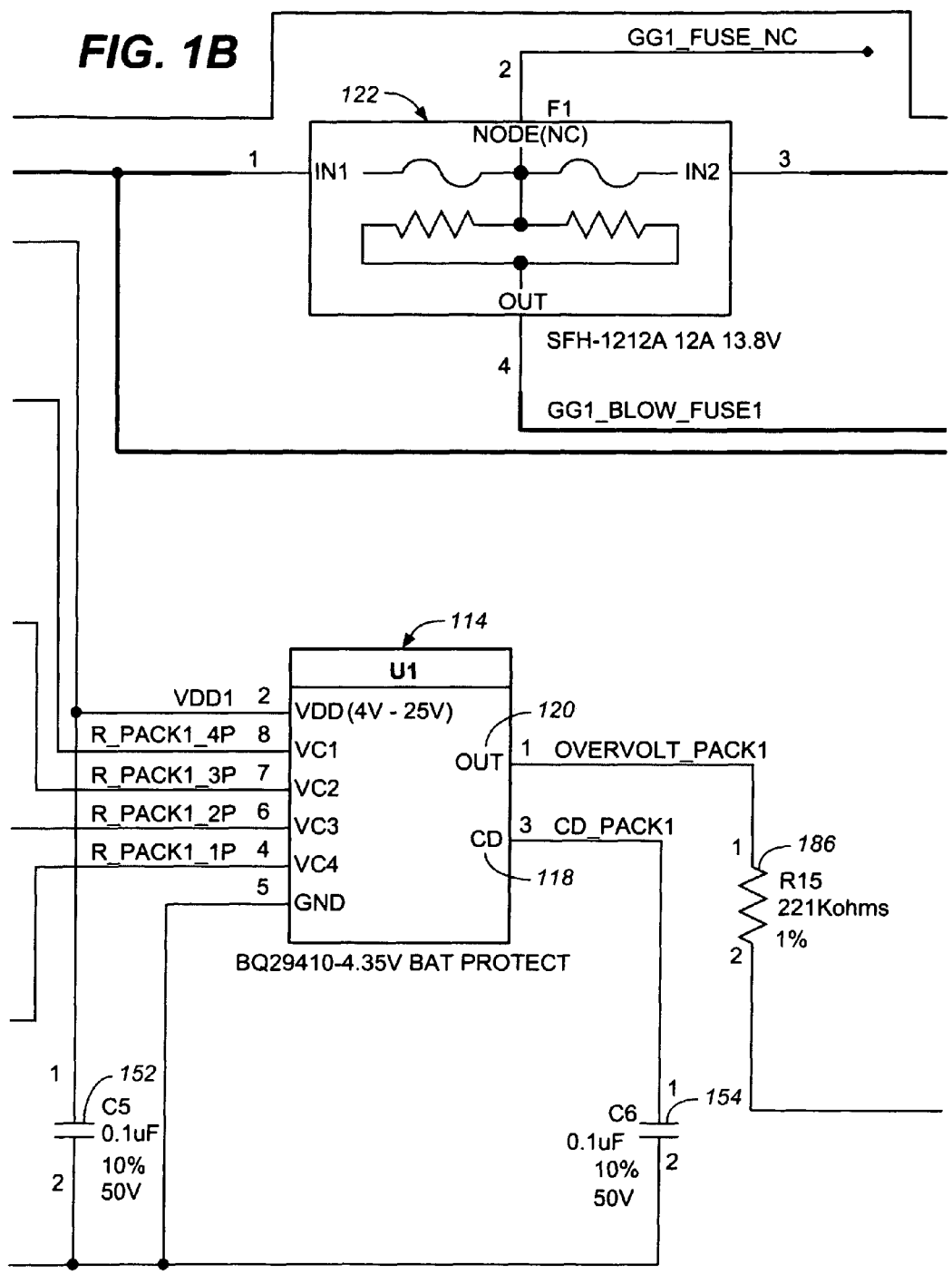
Figure 1C:
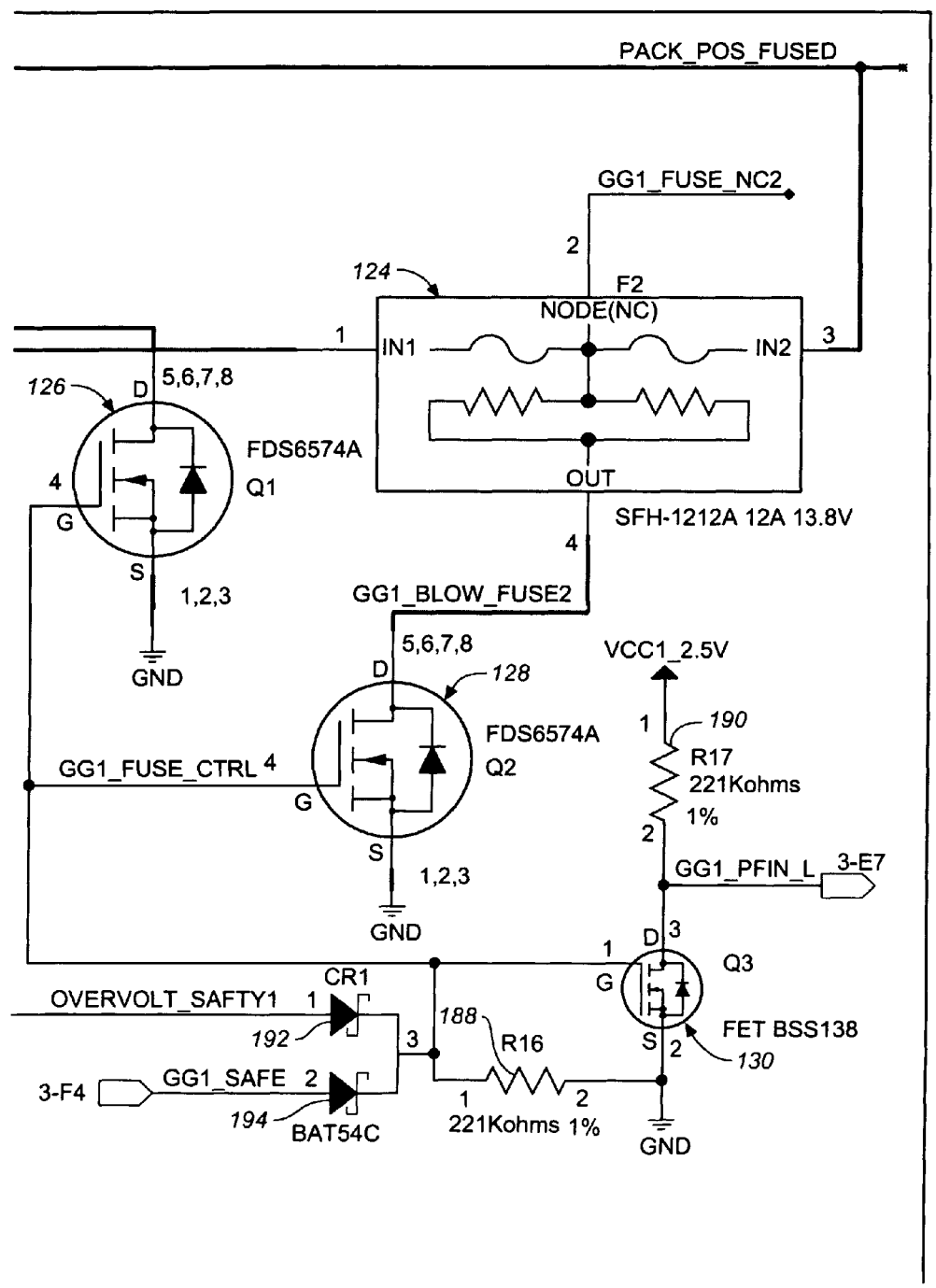
Figure 1D:
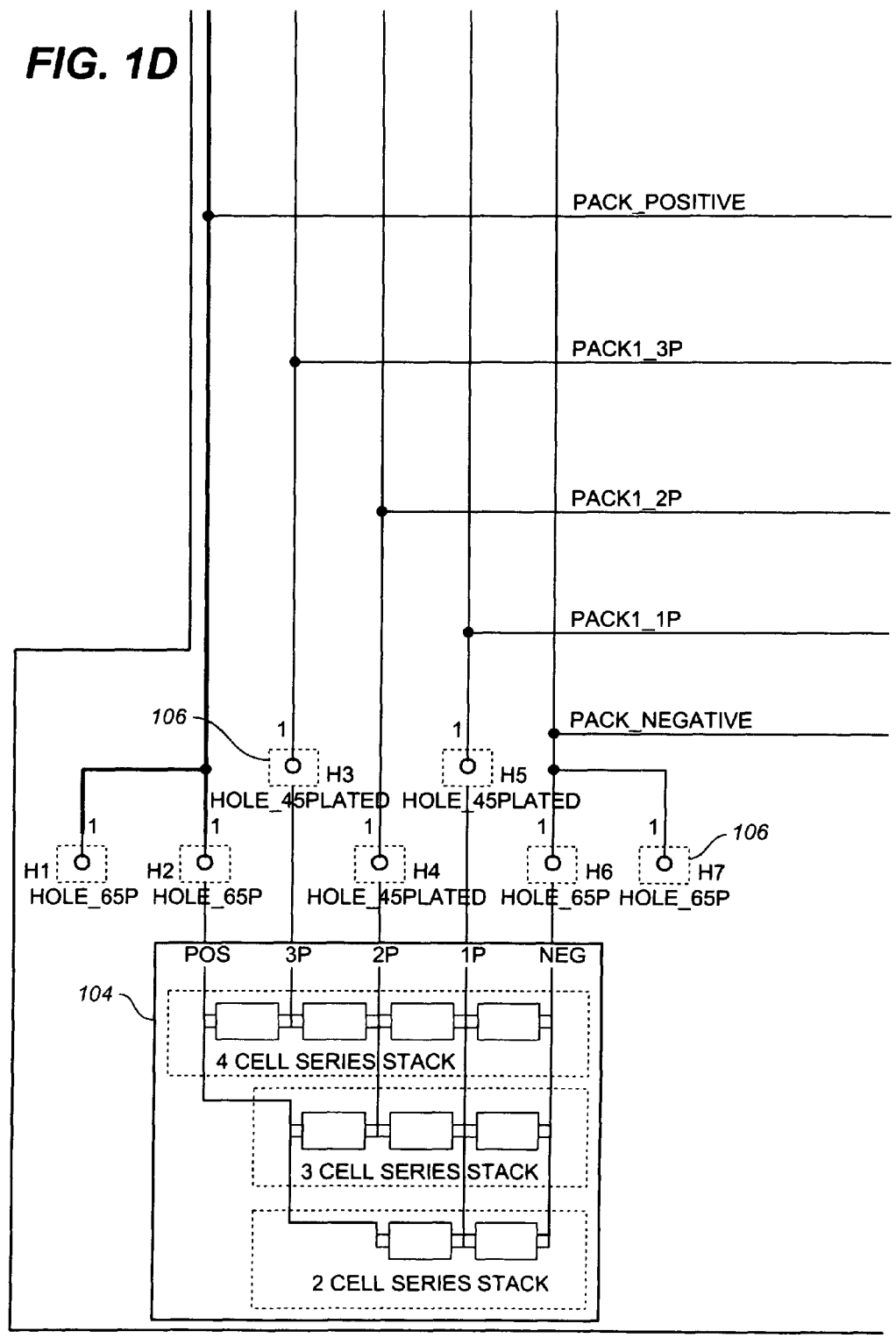

Referring generally to FIG. 1, a Battery Backup Unit (BBU) Assembly/Printed Circuit Board Assembly (PCBA)/Printed Circuit Assembly (PCA) 100 is shown. In exemplary embodiments, the BBU Assembly 100 may include a Printed Circuit Board (PCB)/Printed Wiring Board (PWB)/Etched Wiring Board 102. In further embodiments, the PCB 102 may be populated with a battery pack 104. For example, the battery pack 104 may be connected to the PCB 102 via a plurality of connectors 106. In additional embodiments, the battery pack 104 may include a plurality of cells. For instance, the battery pack 104 may be configured as a 2-cell series stack, a 3-cell series stack, or a 4-cell series stack.

In current embodiments of the present invention, one or more cells included in the plurality of cells of the battery pack 104 may be a Lithium-ion (Li-ion) cell. In exemplary embodiments, the Li-ion cells of the battery pack 104 may implement various possible chemistries. For example, the battery pack 104 may have each of its Li-ion cells implementing a gen1 chemistry, or the battery pack 104 may have each of its Li-ion cells implementing a gen2 chemistry, or each Li-ion cell of the battery pack 104 may be an A123 Li-ion cell (ex.—a Li-ion cell produced/supplied by A123Systems®), or each Li-ion cell of the battery pack 104 may be a Kokam cell (ex.—a Li-ion cell produced/supplied by Kokam America Inc.), or each Li-ion cell of the battery pack 104 may be a Lithium-polymer cell.

In exemplary embodiments of the present invention, the BBU Assembly 100 may include (ex.—the PCB 102 may be populated with/connected to) a first protection circuit 108. For instance, the first protection circuit 108 may be a Lithium-ion battery pack full protection Analog Front End (AFE) Integrated Circuit (IC), such as the BQ29330 as produced/supplied by Texas Instruments®. Further, the first protection circuit 108 may incorporate a 2.5-Volt (V), 16-milliampere (mA) low dropout regulator (LDO) 110 and a 3.3-Volt (V), 25-milliampere (mA) low dropout regulator (LDO) 112. The first protection circuit 108 may further integrate an $I^2C$-compatible interface for extracting battery parameters such as battery voltage, individual cell voltages, and control output status. The first protection circuit 108 may be configured for being programmed with other parameters such as current protection thresholds and delays. The first protection circuit 108 may provide safety protection for overload, short circuit in charge, and short circuit in discharge conditions and can also provide cell overvoltage, battery overvoltage and battery undervoltage protection.

In current embodiments of the present invention, the BBU Assembly 100 may include (ex.—the PCB 102 may be populated with/connected to) a second protection circuit 114. For example, the second protection circuit 114 may be a secondary overvoltage protection Integrated Circuit (IC), such as the BQ29410 as produced/supplied by Texas Instruments®. The second protection circuit 114 may incorporate a high-accuracy precision overvoltage detection circuit which may include a programmable delay circuit for overvoltage detection time. Further, the second protection circuit 114 may be configured for comparing each cell in the battery pack 104 to an internal reference voltage of the second protection circuit 114. Still further, when a cell of the battery pack reaches an overvoltage condition, the second protection circuit 114 may be further configured for implementing a protection sequence. For instance, the second protection circuit 114 may be configured for charging an external capacitor 154 via a CD pin 118 of the second protection circuit 114. Further, when the voltage of the CD pin 118 reaches a pre-determined level (ex.—1.2 V), the second protection circuit 114 may be configured for changing an OUT pin 120 of the second protection circuit 114 from a low level to a high level. Still further, the overvoltage threshold of the second protection circuit 114 may be 4.35 Volts.

In exemplary embodiments, the BBU Assembly 100 may be configured for electrically connecting the battery pack 104 to the first protection circuit 108 and/or the second protection circuit 114. In embodiments in which the BBU Assembly 100 implements/includes the first protection circuit 108 and not the second protection circuit 114, the BBU Assembly 100 may be configured for electrically connecting the battery pack 104 to the first protection circuit 108. In embodiments in which the BBU Assembly 100 implements/includes both the first protection circuit 108 and the second protection circuit 114, the BBU Assembly 100 may be configured for electrically connecting the battery pack 104 to the first protection circuit 108 and the second protection circuit 114.

In current embodiments of the present invention, the BBU Assembly 100 may include (ex.—the PCB 102 may be populated with/connected to) a plurality of blow fuses (122, 124). Further, the blow fuses (122, 124) may be electrically connected to the second protection circuit 114. For instance, the blow fuses (122, 124) may be electrically connected to an output of the second protection circuit 114. Further, the blow fuses (122, 124) may be SFH-112A, 12 ampere (12 A), 13.8-volt (13.8V) blow fuses. In exemplary embodiments, regardless of the whether the battery pack 104 is configured as a 2-cell series stack, a 3-cell series stack, or a 4-cell series stack, the most positive node of the stack is connected to blow fuse 122. In further embodiments, the BBU Assembly 100 may include (ex.—the PCB 102 may be populated with/connected to) a plurality of field-effect transistors (126, 128, 130). A first field-effect transistor 126 included in the plurality of field-effect transistors may be electrically connected to an output of a first blow fuse 122 included in the plurality of blow fuses. A second field-effect transistor 128 included in the plurality of field-effect transistors may be electrically connected to an output of a second blow fuse 124 included in the plurality of blow fuses. In additional embodiments, one or more field-effect transistors included in the plurality of field-effect transistors (126, 128, 130) may be metal-oxide-semiconductor field-effect transistors (MOSFETs). For example, one or more of the plurality of field-effect transistors (126, 128, 130) may be FDS6574A MOSFETs, such as produced/supplied by Fairchild Semiconductor™. Still further, one of the field-effect transistors included in the plurality of field-effect transistors (126, 128, 130) may be an N-channel field-effect transistor (ex.—FET BSS138). In further embodiments, depending on current requirements, only a single blow fuse (ex.—122) may be implemented/included, in which case, the PCB 102 may not be populated with one of the field-effect transistors (ex.—128).

In exemplary embodiments of the present invention, the BBU Assembly 100 may include (ex.—the PCB 102 may be populated with/connected to) a first plurality of capacitors (132, 134, 136, 138, 140, 142), the first plurality of capacitors configured for being connected (ex.—electrically, physically connected) between the battery pack 104 and the first protection circuit 108. For instance, one or more capacitors included in the first plurality of capacitors (132 through 142) may be a 0.1 microFarad, 10%, 50-volt capacitor. Further, one or more capacitors included in the first plurality of capacitors (132 through 142) may be a 0.1 microFarad, 10%, 16-volt capacitor. Still further, one or more capacitors included in the first plurality of capacitors (132 through 142) may be a 1.0 microFarad, 20%, 25-volt capacitor.

In additional embodiments, the BBU Assembly 100 may include (ex.—the PCB 102 may be populated with/connected to) a second plurality of capacitors (144, 146, 148, 150, 152, 154), the second plurality of capacitors configured for being connected between the battery pack 104 and the second protection circuit 114. For instance, one or more capacitors included in the second plurality of capacitors (144 through 154) may be a 0.1 microFarad, 10%, 50-volt capacitor. Further, one or more capacitors included in the second plurality of capacitors (144 through 154) may be a 0.1 microFarad, 10%, 16-volt capacitor.

In current embodiments of the present invention, the BBU Assembly 100 may include (ex.—the PCB 102 may be populated with/connected to) a diode 156. Further, the diode 156 may be connected between the battery pack 104 and the first protection circuit 108. For instance, the diode 156 may be a CR2 diode (ex.—an IN4148W diode).

In exemplary embodiments of the present invention, the BBU Assembly 100 may include (ex.—the PCB 102 may be populated with/connected to) a first plurality of resistors (158, 160, 162, 164, 166, 168, 170). Each resistor included in the first plurality of resistors (158 through 170) may be connected between the battery pack 104 and the first protection circuit 108. For instance, one or more resistors included in the first plurality of resistors (158 through 170) may be a 100 ohm resistor with a 1% tolerance. Further, one or more resistors (such as non-populated resistor 168 and non-populated resistor 170) included in the first plurality of resistors (158 through 170) may be a zero ohm resistor with a 1% tolerance.

In further embodiments of the present invention, the BBU Assembly 100 may include (ex.—the PCB 102 may be populated with/connected to) a second plurality of resistors (172, 174, 176, 178, 180, 182, 184). Each resistor included in the second plurality of resistors (172 through 184) may be connected between the battery pack 104 and the second protection circuit 114. For example, one or more resistors included in the second plurality of resistors (172 through 184) may be a 1 kilo-ohm (Kohm) resistor with a 1% tolerance. Further, one or more resistors (such as non-populated resistor 182 and non-populated resistor 184) included in the second plurality of resistors (172 through 184) may be a zero ohm resistor with a 1% tolerance.

In additional embodiments of the present invention, the BBU Assembly 100 may include (ex.—the PCB 102 may be populated with/connected to) a third plurality of resistors (186, 188, 190). Each resistor included in the third plurality of resistors (186 through 190) may be connected to the output of the second protection circuit 114. For instance, one or more of the resistors included in the third plurality of resistors (186 through 190) may be a 221 kilo-ohm (Kohm) resistor with a 1% tolerance.

In exemplary embodiments, the BBU Assembly 100 may include (ex.—the PCB 102 may be populated with/connected to) one or more Schottky diodes (192, 194) (ex—CR1 or BAT54C Schottky diodes). Further, the Schottky diodes (192, 194) may be electrically connected to the output of the second protection circuit 114.

It is to be understood that the PCB 102 may be populated with components (ex.—resistors, capacitors, etc.) such as described above and as shown in FIG. 1 when the BBU Assembly 100 is implementing a battery pack 104 configured as 4-cell series stack. However, in embodiments where the BBU Assembly 100 is implementing a battery pack 104 configured as a 3-cell series stack, one capacitor included in the second plurality of capacitors (such as capacitor 144) and one capacitor included in the first plurality of capacitors (such as capacitor 134) may be non-populated capacitors (as opposed to being populated capacitors, such as when the battery pack is configured as a 4-cell series stack). Further, in embodiments where the BBU Assembly 100 is implementing a battery pack 104 configured as a 3-cell series stack, one resistor included in the second plurality of resistors (such as resistor 176) and one resistor included in the first plurality of resistors (such as resistor 160) may be non-populated resistors (as opposed to being populated capacitors, such as is the case when the battery pack is configured as a 4-cell series stack). Still further, in embodiments where the BBU Assembly 100 is implementing a battery pack 104 configured as a 3-cell series stack, one resistor included in the second plurality of resistors (such as resistor 182) and one resistor included in the first plurality of resistors (such as resistor 168) may be populated resistors (as opposed to being non-populated resistors, such as when the battery pack 104 is configured as a 4-cell series stack).

In embodiments where the BBU Assembly 100 is implementing a battery pack 104 configured as a 2-cell series stack, two capacitors included in the second plurality of capacitors (such as capacitor 144 and capacitor 146) and two capacitors included in the first plurality of capacitors (such as capacitor 134 and capacitor 136) may be non-populated capacitors (as opposed to being populated capacitors, such as when the battery pack 104 is configured as a 4-cell series stack). Further, in embodiments where the BBU Assembly 100 is implementing a battery pack 104 configured as a 2-cell series stack, two resistors included in the second plurality of resistors (such as resistor 176 and resistor 178) and two resistors included in the first plurality of resistors (such as resistor 160 and resistor 162) may be non-populated resistors (as opposed to being populated resistors, such as when the battery pack 104 is configured as a 4-cell series stack).

In further embodiments, where the BBU Assembly 100 is implementing a battery pack 104 configured as a 2-cell series stack, two resistors included in the second plurality of resistors (such as resistor 182 and resistor 184) and two resistors included in the first plurality of resistors (such as resistor 168 and resistor 170) may be populated resistors (as opposed to being non-populated resistors, such as when the battery pack 104 is configured as a 4-cell series stack).

In exemplary embodiments, the routing of the PCB 102 and the above-referenced component population options may allow for the above-referenced variability to implement different series stacks, while promoting minimization of hardware changes and components. Further, the present invention allows for implementation of multiple pack configurations (ex.—implementation of a 2, 3, or 4-cell stack) with a single PCB 102 for promoting reduced design cycle time and minimization of design testing and verification/certification. The BBU Assembly 100 of the present invention may be implemented with various chargers/charging techniques.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, Solid state drives (SSDs), magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A Battery Backup Unit (BBU) Assembly, comprising:
    a Printed Circuit Board (PCB);
    a first protection circuit connected to the PCB, the first protection circuit being a Lithium-ion battery pack full protection Analog Front End (AFE) Integrated Circuit (IC);
    a second protection circuit connected to the PCB, the second protection circuit being a secondary overvoltage protection Integrated Circuit (IC), the secondary overvoltage protection IC incorporating an overvoltage detection circuit, the overvoltage detection circuit including a programmable delay circuit for overvoltage detection time;
    a battery pack connected to the PCB, the battery pack including a plurality of Lithium-ion (Li-ion) cells, the BBU Assembly being configured for electrically connecting the battery pack to at least one of: the first protection circuit and the second protection circuit, the secondary overvoltage protection IC being configured for comparing each of the plurality of cells of the battery pack to an internal reference voltage of the secondary overvoltage protection IC;
    a first plurality of capacitors connected to the PCB, each capacitor included in the first plurality of capacitors being connected between the battery pack and the first protection circuit; and
    a second plurality of capacitors connected to the PCB, each capacitor included in the second plurality of capacitors being connected between the battery pack and the second protection circuit, when a cell included in the plurality of cells of the battery pack reaches an overvoltage condition, the secondary overvoltage protection IC being configured for implementing a protection sequence, said protection sequence including charging a capacitor included in the second plurality of capacitors via a CD pin of the second protection circuit and, when a voltage of the CD pin reaches a pre-determined level, the second protection circuit is further configured for changing an OUT pin of the second protection circuit from a first level to a second level,
    wherein the battery pack is configured as one of a 2-cell series stack, a 3-cell series stack, and a 4-cell series stack.

2. A BBU Assembly as claimed in claim 1, further comprising:
    a blow fuse connected to the PCB, the blow fuse configured for being electrically connected to the second protection circuit.

3. A BBU Assembly as claimed in claim 2, further comprising:
    a field-effect transistor connected to the PCB, the field-effect transistor configured for being electrically connected to an output of the blow fuse.

4. A BBU Assembly as claimed in claim 1, further comprising:
    a diode connected to the PCB, the diode being connected between the battery pack and the protection circuit.

5. A BBU Assembly as claimed in claim 1, further comprising:
    a first plurality of resistors connected to the PCB, each resistor included in the first plurality of resistors being connected between the battery pack and the first protection circuit;
    a second plurality of resistors connected to the PCB, each resistor included in the second plurality of resistors being connected between the battery pack and the second protection circuit; and
    a third plurality of resistors connected to the PCB, each resistor included in the third plurality of resistors being connected to an output of the second protection circuit.

6. A Battery Backup Unit (BBU) Assembly, comprising:
    a Printed Circuit Board (PCB);
    a Lithium-ion battery pack full protection Analog Front End (AFE) Integrated Circuit (IC) connected to the PCB, the Lithium-ion battery pack full protection AFE IC including a 2.5 Volt, 16 milliampere (mA), low dropout regulator and a 3.3 Volt, 25 milliampere (mA), low dropout regulator;
    a secondary overvoltage protection Integrated Circuit (IC) connected to the PCB, the secondary overvoltage protection IC incorporating an overvoltage detection circuit, the overvoltage detection circuit including a programmable delay circuit for overvoltage detection time;
    a battery pack connected to the PCB, the battery pack being configured for being electrically connectable to the Lithium-ion battery pack full protection AFE IC and the secondary overvoltage protection IC, the battery pack including a plurality of Lithium-ion (Li-ion) cells, the secondary overvoltage protection IC being configured for comparing each of the plurality of cells of the battery pack to an internal reference voltage of the secondary overvoltage protection IC, when a cell included in the plurality of cells of the battery pack reaches an overvoltage condition, the secondary overvoltage protection IC being configured for implementing a protection sequence;
    a blow fuse connected to the PCB, the blow fuse being electrically connected to an output of the secondary overvoltage protection IC,
    wherein the battery pack is configured as one of a 2-cell series stack, a 3-cell series stack, and a 4-cell series stack.

7. A BBU Assembly as claimed in claim 6, further comprising:
    a field-effect transistor connected to the PCB, the field-effect transistor being electrically connected to an output of the blow fuse.

8. A BBU Assembly as claimed in claim 6, further comprising:
    a first plurality of capacitors connected to the PCB, each capacitor included in the first plurality of capacitors being connected between the battery pack and the first protection circuit; and
    a second plurality of capacitors connected to the PCB, each capacitor included in the second plurality of capacitors being connected between the battery pack and the second protection circuit.

9. A BBU Assembly as claimed in claim 6, further comprising:

a diode connected to the PCB, the diode being connected between the battery pack and the first protection circuit.

10. A BBU Assembly as claimed in claim 6, further comprising:
  a first plurality of resistors connected to the PCB, each resistor included in the first plurality of resistors being connected between the battery pack and the first protection circuit;
  a second plurality of resistors connected to the PCB, each resistor included in the second plurality of resistors being connected between the battery pack and the second protection circuit; and
  a third plurality of resistors connected to the PCB, each resistor included in the third plurality of resistors being connected to an output of the second protection circuit.

11. A BBU Assembly as claimed in claim 7, wherein the field-effect transistor is a metal-oxide-semiconductor field-effect transistor (MOSFET).

12. A BBU Assembly as claimed in claim 6, further comprising:
  a Schottky diode connected to the PCB, the Schottky diode being electrically connected to an output of the secondary overvoltage protection IC.

* * * * *